United States Patent
Landis et al.

[11] 3,909,586
[45] Sept. 30, 1975

[54] METHOD AND MEANS FOR REMOVING SMOKE FROM OPEN ARC WELDING OPERATIONS

[75] Inventors: George Gideon Landis, Pepper Pike; Joseph Rudolph Nosse, Richmond Heights; Ivan Edward Baker, Euclid, all of Ohio

[73] Assignee: The Lincoln Electric Company, Cleveland, Ohio

[22] Filed: May 8, 1972

[21] Appl. No.: 251,223

[52] U.S. Cl. ............... 219/130; 219/74; 219/136
[51] Int. Cl.² ........................................ B23K 9/00
[58] Field of Search ............. 219/130, 136, 75, 74

[56] References Cited
UNITED STATES PATENTS

| | | | |
|---|---|---|---|
| 2,683,791 | 7/1954 | Ruehlemann et al. | 219/130 |
| 3,047,714 | 7/1962 | Wepfer | 219/130 X |
| 3,514,567 | 5/1970 | Strang | 219/74 |
| 3,597,576 | 8/1971 | Bernard et al. | 219/136 |
| 3,707,616 | 12/1972 | Lindkvist | 219/136 |
| 3,798,409 | 3/1974 | Troyer et al. | 219/130 |

FOREIGN PATENTS OR APPLICATIONS

| | | | |
|---|---|---|---|
| 1,134,557 | 11/1968 | United Kingdom | 219/130 |
| 1,526,305 | 5/1968 | France | 219/136 |

OTHER PUBLICATIONS
"Ventilation," Welding Engineer, 10/70, pp. 43, 44.

Primary Examiner—J. V. Truhe
Assistant Examiner—Clifford C. Shaw
Attorney, Agent, or Firm—Meyer, Tilberry & Body

[57] ABSTRACT

Apparatus for removing the smoke and fumes generated by an electric welding arc wherein an exhaust tube is placed in the vicinity of the source and a shield is placed between the arc and the exhaust tube, intake port, nozzle and contact tip, so designed that the smoke and fumes will be efficiently collected without undue heating or a rapid buildup of weld spatter on the exhaust tube, intake port, nozzle and contact tip surfaces.

8 Claims, 5 Drawing Figures

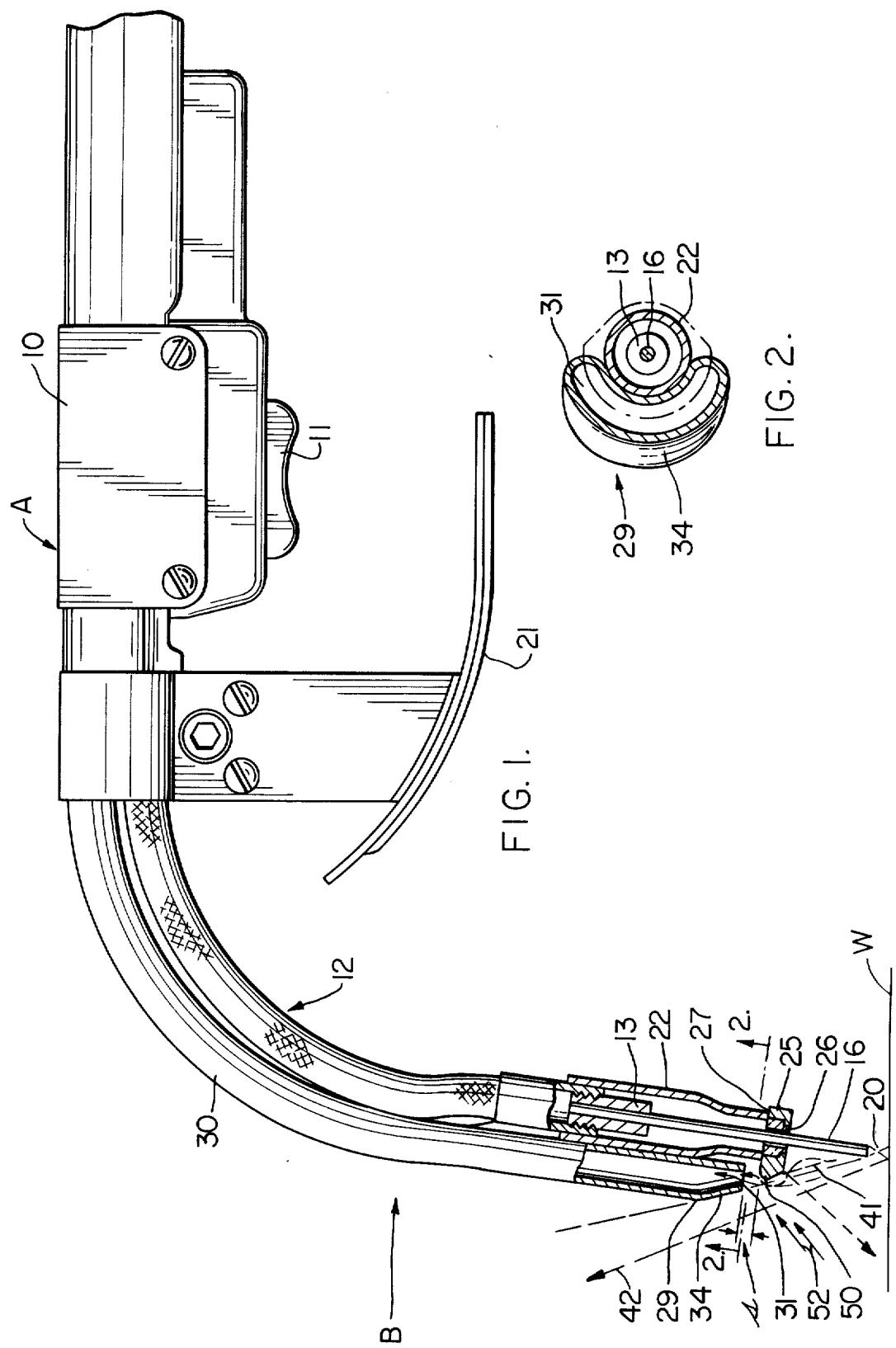

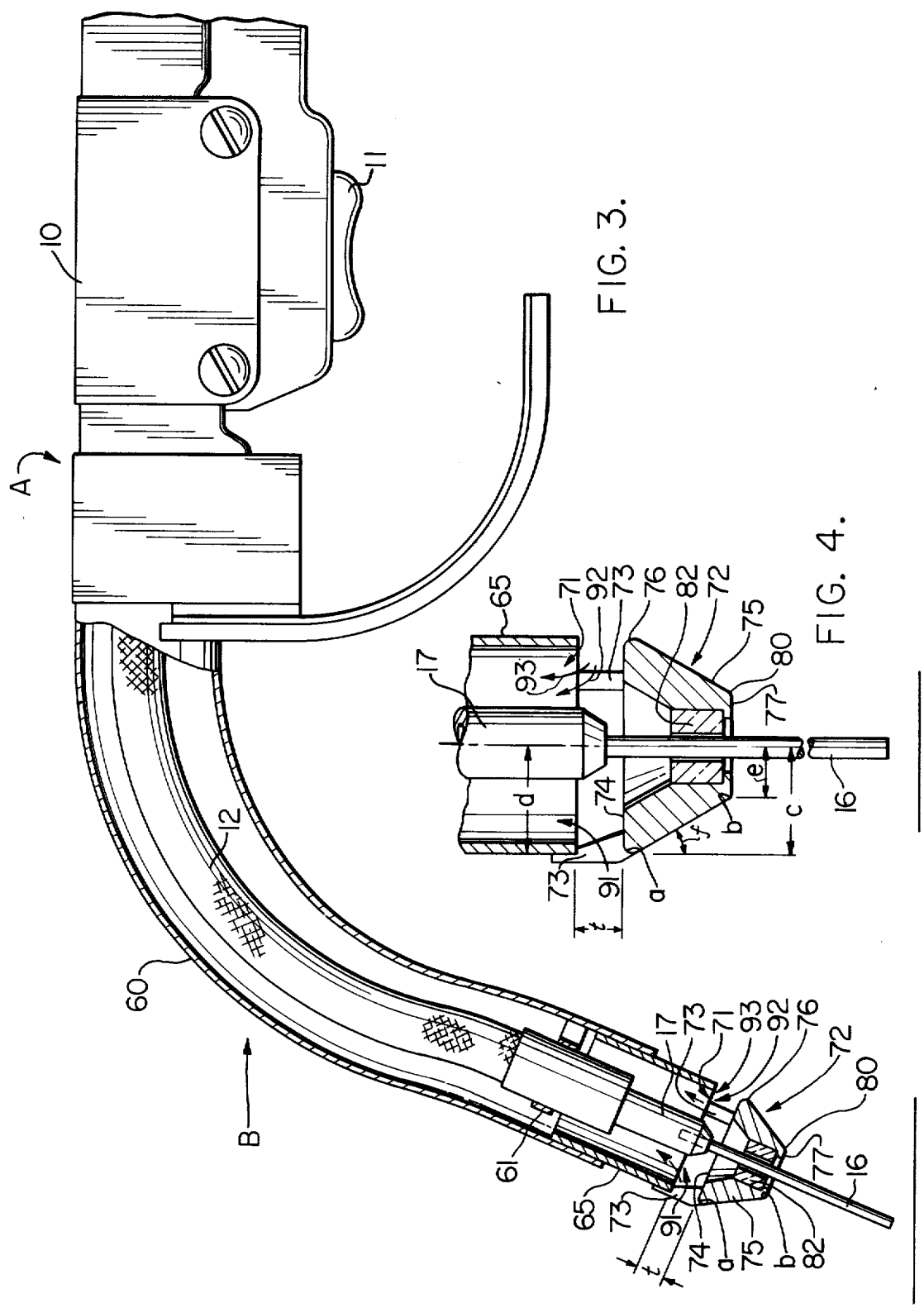

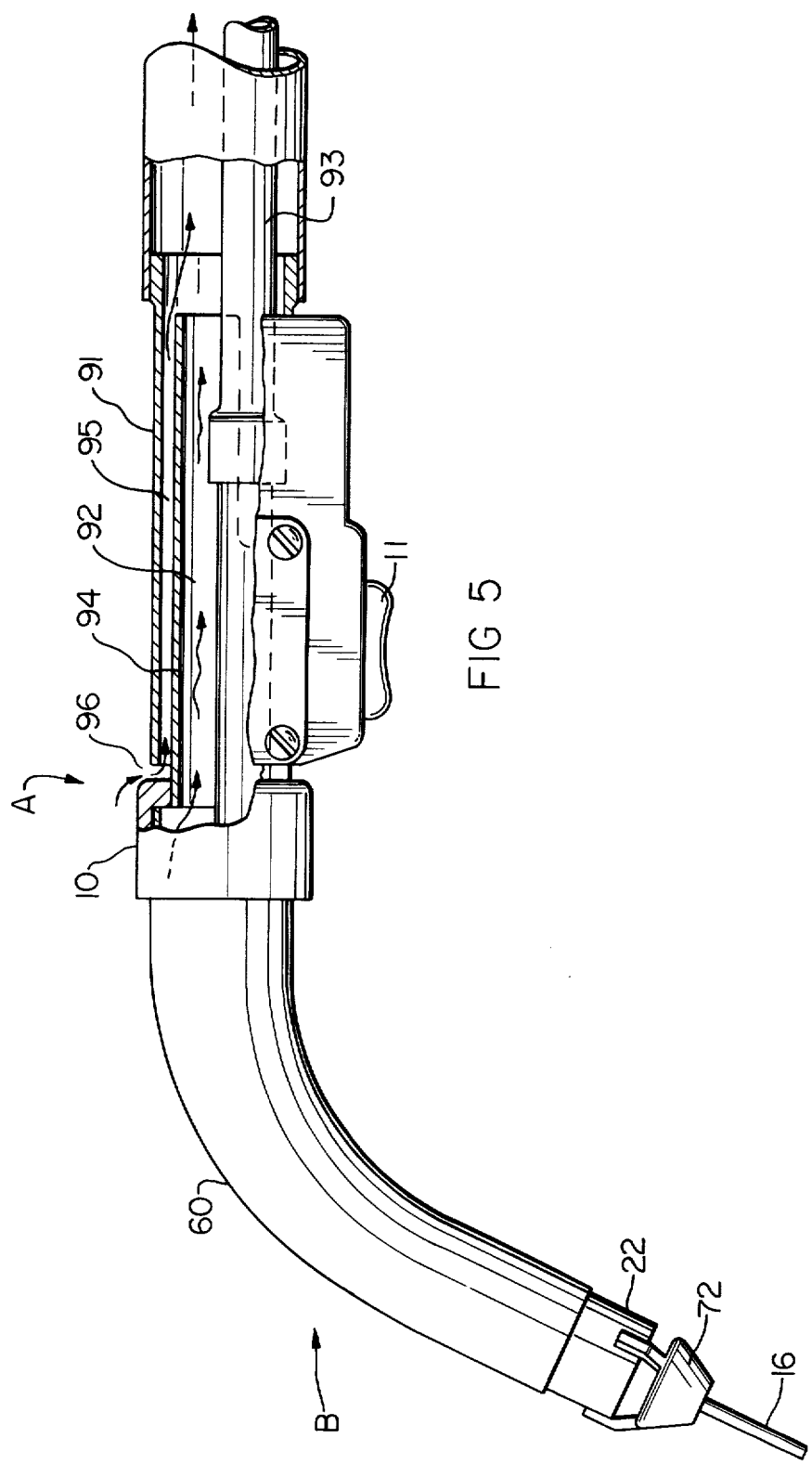

METHOD AND MEANS FOR REMOVING SMOKE FROM OPEN ARC WELDING OPERATIONS

This invention pertains to the art of electric arc welding and more particularly to arc welding apparatus having means for the removing of the smoke and fumes which are generated by an electric welding arc.

The invention is particularly applicable to the removal of smoke and fumes generated by a self-shielded, open arc, semi-automatic or fully automatic, welding process and will be described with particular reference thereto, although it will be appreciated that the invention has other and broader applications wherein smoke and fumes are generated by an arc welding process which does not require externally supplied protection.

In the art of electric arc welding, because of the use of fluxes and other ingredients necessary to effect the weld, which fluxes are either placed on the inside of a tubular electrode or on the outside thereof, smoke and fumes are generated which until now have been allowed to dissipate into the area surrounding the welding operation. Such fumes are removed by the ventilation systems of the plant where the welding operation is taking place or are simply allowed to settle out onto the floor and other surfaces of the room creating a housekeeping problem.

Airborne, the welding smoke decreases the desirability of the environment and the fumes often create a smog condition within the industrial plant cutting down the light and reducing visibility.

It has been proposed in the past to provide a vacuum cleaner unit having an exhaust tube placed close to the welding operation which sucks the smoke from the arc area and dissipates it either outside of the building or into an air scrubber. Heretofore, difficulties have existed with such arrangements because of weld spatter sticking to and blocking the intake port, necessitating the continuous cleaning and/or frequent replacement of the exhaust tube. The sticking problem was aggravated by the exhaust tube becoming heated due to heat transfer from the sticking weld spatter as well as by radiation from the arc itself and by the superheated smoke being drawn from the arc area. The exhaust tube can reach very high temperatures, for example in excess of 650°F. At such temperatures, the exhaust tube is much more susceptible to collecting weld spatter. Further, this superheated smoke heats the exhaust hose requiring special heat resistant hose. Also, the hose becomes hot enough to be uncomfortable to the operator.

The present invention provides a smoke removal system which overcomes all of the above referred difficulties of others and provides an arrangement wherein the smoke is quickly removed from the arc area with a minimum of intrusion of heavy spatter on the exhaust tube inlet port and with a reduction of the effects of radiation heat and heat of the hot gases on the system.

In accordance with the present invention, a shield is positioned on the direct line from the arc to the exhaust tube inlet port such that the weld spatter moving in a straight line from the arc will not contact the area around the inlet port and such that the lightweight smoke and fumes emanating from the arc must change direction before they enter the inlet port. In this manner the heavier, larger particles of spatter cannot directly impinge on the inlet port area but will tend to be deflected or fly on by the intake port because the velocity of air is not sufficient to change their direction of travel.

Elimination of the impingement of these larger particles with their high heat content on the exhaust tube, and in some cases the contact tip and nozzle surfaces, not only reduces the heat input to these parts but significantly increases the operating time before they must be cleaned of spatter.

Further, the shield is so designed to prevent arc heat radiation from direct impingement to the interior of the electrode gun and is aerodynamically constructed to give maximum smoke pickup for a given amount of suction at the inlet port.

Further, there is provided an exhaust tube adapted to be placed in proximity to the source of smoke and fumes and having an intake port located in such a manner relative to the arc so as to not only draw in the smoke and fumes but also cooler ambient air such that the exhaust tube will be cooled and can operate at a lower temperature.

Further, the tube is made of a high conductivity metal such as copper so that the mixture of hot gases with other cooler ambient air cools the walls of the exhaust tube particularly remote from the opening and any heat absorbed by the entrant end of the exhaust tube, for example, by radiation from the arc or by the hot superheated gases from the welding operation is conducted through the tube away from the end. The entrant end of the exhaust tube is thus continuously cooled.

By diluting the hot gases from the arc with ambient air, the mixture is much cooler and the exhaust hose running from the vacuum source to the exhaust tube can be of a material capable of functioning at much lower temperatures.

The shield provides a means by which the operator can judge the proper electrical stickout of the electrode for proper process operation.

Still further, the smoke removal system, for instance the handle of a gun when the system is used for semi-automatic welding is provided with air passages whereby the suction can be used to draw cooling air therethrough.

The principal object of the invention is the provision of a new and improved arrangement for removing smoke and fumes from a localized source of smoke and fumes which is simple in construction, simple in operation and inexpensive to build.

A further object of the invention is the provision of a new and improved apparatus of the type described wherein the larger and heavier spatter cannot enter the intake port resulting in reduced maintenance.

A further object of the invention is the provision of a new and improved apparatus of the type described wherein the larger and heavier spatter cannot enter the intake port resulting in cooler operating temperatures of the apparatus and less tendency for the spatter to stick to the apparatus.

Another object of the invention is the provision of a new and improved arrangement of the type described wherein the smoke and fumes are mixed with cooler air and an exhaust hose of special construction to resist high temperatures in not required.

A further object of the invention is the provision of a new and improved apparatus of the type described wherein the smoke and fumes are inherently cooled by the addition of substantial amounts of ambient air and the operator is not subjected to the discomfort of heat radiated from the exhaust hose or even by being burned by the temperatures of the hose.

A further object of the invention is the provision of a shield between the arc and an adjacent exhaust tube so positioned as to prevent direct impingement of the radiant heat or weld spatter from the arc onto the tube but shaped so as to encourage the flow of the gases and fumes from the arc into the tube as well as cool ambient air.

The invention may take physical form in certain parts and arrangement of parts, a preferred embodiment of which will be described in this specification and illustrated in the accompanying drawings which are a part hereof and wherein.

FIG. 1 is a side elevational view partly in cross-section illustrating one preferred embodiment of the invention.

FIG. 2 is a cross-sectional view of FIG. 1 taken approximately on the line 2—2 thereof.

FIG. 3 is a side elevational view partly in cross-section and partly in schematic illustrating a second preferred embodiment of the invention.

FIG. 4 is an enlarged sectional view of the shield and inlet port of the exhaust tube.

FIG. 5 is a partly sectional view of the gun handle showing the cooling passages therefor.

Referring now to the drawings wherein the showings are for the purpose of illustrating preferred embodiments of the invention only and not for the purpose of limiting same, the figures show having conventional semi-automatic welding gun A havinb an exhaust hose existing at the rear of the gun handle. The exhaust hose is then connected to a source of vacuum to provide an air intake at the inlet port of sufficient volume to remove the smoke from the arc area. Approximately 35 C.F.M. is adequate for this purpose.

In the embodiment shown, the welding gun A is comprised of a handle 10, having incorporated therein a trigger switch 11 and an elongated generally arcuate electrode nozzle 12 having at its end a contact tip 13. The contact tip 13 is energized from a suitable source of electric power (not shown). An electrode 16 is pushed from a remote location by an electric motor (not shown) which actuates drive rolls (not shown) which pull the electrode 16 from a source of electrode wire and push it through a cable (not shown) and handle 10 through a passage in the electrode nozzle 12 and out of the contact tip 13. The tip energizes the electrode 16 as it is advanced therepast toward the workpiece W. An arc 20 continuously melts off the end of the electrode. Actuation of the trigger switch 11 energizes the electrode 16 and the electric motor to start (and stop) the welding operation. A shield 21 protects the hand of the operator (not shown) on the handle 10 from the heat radiated from the arc 20.

A cylindrical member 22 fits over the lower end of the electrode nozzle 12 and extends beyond the contact tip 13. A shield member 25 is fastened to the lower end of this guide member 22 which shield member 25 has a ceramic insert 26 mounted therein with a passage therethrough through which the electrode 16 moves. The ceramic insert 26 electrically insulates the portion of the electrode 16 sticking out beyond the exit end of the contact tip 13 from shield 25. The distance from the end of the tip 13 and the arc 20 is known in the art as the electrical "stickout" distance.

With the exception of the shield 25, which will be referred to hereinafter, what has been described so far is relatively conventional in the art, and may take a number of other different forms without departing from the invention.

The exhaust tube B may also take any one of a number of different forms, but as shown in FIG. 1, is in the form of an elongated, generally arcuate tube 30 mounted on the electrode nozzle 12 and extending generally parallel thereto. This tube 30 at its lower end 29 has a downwardly-facing opening or inlet port 31 located generally adjacent to, but spaced from the arc 20. The tube 30 may have any cross-sectional shape, but generally at a point spaced remote from the arc is round in cross-section. In the areas adjacent to the inlet opening 31, the wall of the tube adjacent the nozzle 12 is collapsed inwardly to provide a crescent-shaped cross-section. Thus, the opening 31 is in the shape of a crescent with the ends of the crescent being rounded such that the opening 31 extends for a substantial arc, around the end of the member 22. It is to be further noted that the outer wall of the tube 30 adjacent the inlet opening 31 tapers inwardly toward the electrode as at 34 so as to restrict the area of the inlet opening 31 relative to the area of the tube 30. This also limits the radial spacing of the outer periphery of the opening from the axis of the electrode 16 for reasons which will appear hereinafter. In general, surface 34 forms a partial frustrum of a cone with the apex corresponding to the center of the arc 20. The apex may be above the arc but preferably never below.

The shielding member 25 is mounted on the lower end of the member 22 so that its upper surface 27 is spaced a distance s below the opening 31. The shielding member 25 extends radially outwardly from the axis of the electrode beyond the sides of member 22 a distance such as to completely shield the opening 31 from the arc 20. In this respect the edges of the shielding member 25 are shown as being tangent with the plane of the cone formed by the surface 34. Thus, the edge of the shielding member 25 when viewed in a direction axially of the electrode, has an arcuate periphery generally parallel to the surface 34 and at least tangent with the plane at the cone of the surface 34. The shield 25 is always interposed between the arc 20 and the crescent-shaped opening 31. Any spatter emanating from the arc 20, e.g. on a line 41 which would tend to enter the opening 31 instead impinges on the lower surface of the shield 25 and either clings thereto or is deflected away therefrom. Any spatter moving, e.g. on a line 42, which would clear the outer periphery of the shield 25 will also clear the surface 34 and will pass upwardly until it loses its velocity and ultimately falls away. The inlet port is at all times, in accordance with the invention, shielded from the direct impingement of weld spatter from the arc 20. Thus, the upper surface 27 of the shield member 25 must be spaced from the intake port 31 so as to provide a space through which air and weld fumes can enter the inlet port 31. Further, the radial extent of the member 25 will vary depending upon spacing s of its upper surface 27 from the lower end of the exhaust tube.

As the spacing s increases, the radial dimension of the shield member 25 which shields the inlet port 31 and the lower end 29 of the exhaust tube can be decreased for the same protection.

The shielding of the opening 31 from the weld spatter emanating from the arc 20 however, does not interfere with the passage of the gas fumes emanating from the arc 20 from moving upwardly on paths indicated generally at 50 from passing into the opening 31. Thus, these gases do not have the inertia against the change in their direction that the weld spatter does and can move readily around the periphery of the shield member 25 into the inlet opening 31. To encourage the easy flow of these gas fumes 50, around the outer periphery of the shield member 25, this periphery is generally rounded in longitudinal cross-section generally as shown in FIG. 1.

With the spacing s, the existence of a vacuum in the opening 31 will also cause a flow indicated generally by the arrows 52 of the ambient air into the inlet opening 31. This flow of ambient air is an important part of the present invention because such air being cool, mixes with the superheated fumes emanating from the arc and cools these gases such that the tempeature of the mixture of air and fumes in the tube 30 will be substantially reduced; such that any heat absorbed by the surfaces of the exhaust tube surrounding the opening 31 by radiation from the arc will be conducted upwardly through the tube 30 and be convected away by the cool mixture of ambient air and fumes from the arc.

In operation, the tube 30 is connected to a vacuum source (not shown) sufficient to cause a flow of gases through the opening 31 of approximately 35 cubic feet per minute. The energized electrode 16 is advanced toward the workpiece with the arc 20 maintained therebetween. The arc melts both a puddle on the workipece and the end of the electrode 16 as it is continuously advanced towards the workpiece. Flux ingredients either on the inside or outside of the electrode 16 are solid at room temperature. However, in the heat of the arc, these flux ingredients and/or some of the electrode metal either break down, combine chemically, and/or burn to form gases and/or finely divided particles in the form of smoke which continuously emanate from the arc. These gases and smoke are at an elevated temperature. As they move outwardly from the arc they are caught up by the flow of ambient air into the opening 31 and are sucked into the exhaust tube 30. These particles and the gases emanating from the arc are in a highly superheated condition. However, as they enter the opening 31 they are mixed with the surrounding ambient air which is also sucked into the opening 31. Because there is a substantial volume of ambient air mixed with these emanating gases, the resultant temperature of the mixture of gases in the exhaust nozzle 30 is relatively cool.

At the same time, the lower end of the exhaust tube 30 is in close proximity to the arc and absorbs heat therefrom as well as the heat conducted from shield 25 into member 22. However, because of the relatively cool gases flowing through the exhaust nozzle 30, the tube is continuously cooled and the heat absorbed by the exhaust tube is conducted upwardly through the metal and is then transferred to the cool gases flowing therethrough.

In actual welding conditions, it has been found that the inlet end of the exhaust tube reaches an equilibrium temperature of less than 300°F. After the welding is stopped, if the vacuum is allowed to continue to flow, the exhaust tube then cools back to ambient temperature in less than 180 seconds.

The design described has the following advantages:

1. The only surface which is exposed to the spatter is the shielding member 25. This member is out in the open and any spatter which happens to cling thereto is easily brushed off.

2. Little or no spatter gets into the difficult-to-clean interior of the exhaust tube 30 and that which does has little tendency to stick to the surfaces because they are relatively cool. Furthermore, because the only spatter that can enter the opening 31 must have been drawn thereinto by means of the flow of the cooler ambient air, the particle itself will be cooler when it does impinge on the inside of the tube 30.

3. Because little or no spatter, which has a large heat capacity, come into contact with the surfaces of the exhaust tube 30, the tendency is for this tube to operate at much cooler temperatures than would be the case if the spatter were allowed to impinge directly onto the surfaces of the tube 30.

The gun construction shown in FIG. 1 is completely adequate for many applications and is simple in construction and maintenance. There are, however, some applications where having the inlet port concentric with the electrode is beneficial. Such a concentric design is shown in an alternative embodiment of the invention in FIG. 3. It will be noted however, that the principal of operation is similar in both cases and the description of operation previously given is applicable to both.

Referring now to FIG. 3, an exhaust tube 60 extends concentrically around the electrode nozzle 12 to a point generally close to but short of the extreme end of contact tip 17. This tube 60 is held in concentric-spaced relationship with the end of the electrode nozzle 12 by means of a ring 61 mounted on nozzle 12 and having three small lugs extending radially outwardly therefrom into engagement with the inner wall of the tube 60.

The inlet port and shield is formed by means of the exhaust tube extension 65 telescopingly fitted within the lower end of the exhaust tube 60 and terminating at a point generally close to the extreme lower end of the contact tip 17. This exhaust tube extension 65 has a cylindrical intake opening 71 concentrically arranged around the tip 17. A shield member 72 is mounted in spaced relationship below the end of the tube 65 by means of three relatively circumferentially narrow members 73 which are brazed or otherwise fastened to the outer surface of the lower end of the tube 65 and to the upper surface of the shielding member 72. These members 73 support the shielding member 72 so that its upper surface 74 is spaced a distance t from the lower end of the tube 65 to provide a passage for the flow of gases inwardly through the opening 71. The upper surface 74 of the shielding member 72 joins with a downwardly and inwardly tapering surface 75 through an arcuate surface 76 having a radius $a$. The shielding member 72 also has a lower surface 77 joining with the tapered surface 75 through an arcuate surface 80 having a radius $b$.

The shielding member has a maximum radius $c$ preferably equal to or slightly greater than the maximum radius $d$ (FIG. 4) of the tube 65 so that in all instances the entire opening is shielded not only from the heat radiation from the arc but from the path of any weld spatter ejected from the arc.

The shielding member is preferably formed of copper metal and has a ceramic insert 82 therein with an opening therethrough for the passage of the electrode 16.

With this arrangement, spacing of the surface 77 from the lower end of the contact member 17 may be readily adjusted by sliding the tube 65 in the exhaust tube 60 or by adjusting the length of the tube 65 or both. This enables the operator to vary the stickout distance while maintaining a constant spacing of the lower surface 77 from the workpiece.

In operation, a vacuum in the exhaust tube 60 causes a flow of ambient air, for example on the lines 91, 92 and 93 to flow inwardly through the space between the upper surface 74 of the shield member 72 and the lower end of the tube 65, and into the inlet port 71. During welding, the gases evolved move upwardly and outwardly from the arc 20 and are also sucked into the inlet port and the exhaust tube 60 where they are mixed with the ambient air and the resultant temperature of the mixture is of course substantially below that of the hot gases emanating from the arc.

In addition weld spatter from the arc 20 is projected on straight lines upwardly and outwardly from the arc. Some of this spatter will strike the lower surface 77 of the shielding member and either be deflected or will stick thereto. However, such spatter is easily removed from such a surface. Other spatter will strike the tapered surface 75 at what may be termed a glancing blow and will normally be deflected outwardly. The tendency for spatter to stick to the surface 75 is very little. However, any particles that either strike the surface 75 or move upwardly tangent thereto have a velocity and mass such that their direction of movement will not be changed by the flow of gases into the opening 71 and these particles will not flow into the opening 71 where they would tend to stick and would be difficult to remove.

The concentric design as shown in FIG. 3 has several further advantages over the design shown in FIG. 1. The most important is the cooling effect the gases going into inlet opening 71 have on the contact tip 17 of nozzle 12. This tip is heated by large currents flowing across the resistance of the sliding contact between the tip 17 and the electrode 16. As an example, the contact tip 17 can be reduced in operating temperature from approximately 1000°F using construction as shown in FIG. 1 to 600°F with the construction shown in FIG. 3.

A second advantage is the ease of changing the position of the shield assembly relative to the contact member in order to have different electrical stickouts. For example, by changing the length or position of sleeve 65 on exhaust tube 60 the shielding member 72 can be located at a different distance from the lower end of contact tip 17. Thus, when the operator holds shielding member 72 at the same mechanical distance from the arc, a change in the electrical stickout results. This change in electrical stickout is most useful in increasing or decreasing the meltoff rate of the electrode as more fully explained in U.S. Pat. No. 2,721,249, owned by the assignee of this application.

Although the design and the physical relationship of the inlet opening 71 and shielding member 72 can take a number of different configurations it has been found that for the most efficient operation with a given available vacuum the following design is preferred. Referring to FIG. 4, the dimensions below are deemed critical.

|  | Invention Range | Preferred Range |
|---|---|---|
| Radius c | 5/16" – 3/4" | 7/16" – 9/16" |
| Ratio of Radius c/Radius e | 1/1 to 6/1 | — |
| Angle f | 0 – 45° | 30° – 45° |
| Radius a | 1/16' – 1/4" | 1/8" – 3/16" |
| Spacing t | 1/16" to 1/2" | 3/16" – 5/16" |

In the concentric design radius d should be approximately equal to radius c although it can be greater as long as it does not extend past a straight line starting at the arc area and being tangent to the outside diameter of shielding member. In other words, spatter emanating from the arc must not be able to go on a straight line directly into the inlet port 71. It will be appreciated that the above dimensional ranges are equally applicable to the corresponding dimensional ranges shown in the embodiment of FIG. 1. In the case of a side inlet port design as shown in FIG. 1, the corresponding radius d will usually be greater than the corresponding radius c. but again it should not be so large as to allow spatter from the arc to enter the opening directly.

Using the inlet port design described above, maximum air flow efficiency is obtained along with minimum spatter pickup. Radius a is important in that it insures an aerodynamically smooth flow of air around the lip of shielding member 72 with minimum loss due to eddy currents as the gases change direction.

Radius c is limited in maximum size by the operator's ability to see around it to observe the arc. Its minimum size is controlled by radius d which in turn is a function of the required area of the tube formed by radius d to exhaust sufficient volume of gases to clear the arc area of the smoke and fumes. Thus, once radius d is established radius c can be determined as described above in order to fulfill its function of shielding the inlet port.

The principle function of angle f and the ratio of radius c to radius e is to deflect the spatter which hits the exposed lower surfaces of shielding member 72. In this respect, it is beneficial to minimize any surface normal to the arc. Spatter hitting an angled surface is much less likely to stick to the surface.

To further the operator's comfort on high current applications it has been found that venting a small amount of cool air through the gun handle can make a significant improvement in handle temperature. For example, as shown in FIG. 5, the handle includes a cover 91 which surrounds an exhaust duct 92 and the electrode cable 93, which lead through the handle. A thin wall tube 94 confines the smoke and fumes as they enter the handle from the vacuum tube 60 so they do not contact the inside walls of cover 91. There is a space 95 between the inside diameter of cover 91 and the outside diameter of tube 94 to form a channel into which outside cool air enters at port 96. The air keeps the outside of the gun at a comfortable temperature and then mixes with the smoke and fumes being exhausted at the rear of the gun. This cooler air further cools the exhaust gases to lower the temperature of the exhaust hose leading from the handle to the vacuum source.

Using the present invention, it has been found possible to completely exhaust the fumes from the welding arc while keeping the heavy spatter out of the intake port and maintaining the exhaust tube at a relatively low temperature.

The invention has been described in detail in connection with a preferred embodiment. Obviously, alterations and modifications will occur to others upon a reading and understanding of this specification, and it is my intention to include all such modifications and alterations insofar as they come within the scope of the appended claims.

Having thus described our invention, we claim:

1. In a welding gun for self-shielded arc welding including an elongated electrode nozzle having a continuous longitudinal passage therethrough and a contact tip through which an arc welding electrode is adapted to be moved axially of the tip toward a workpiece to be welded while an arc is maintained between the end of the electrode and the workpiece, said arc generating heated fumes and smoke, and means including a source of vacuum for removing said fumes and smoke generated at the arc, the improvement comprising: said means including an exhaust tube having a first end communicating with said source and a second end open toward said workpiece, a shield member, means spacing said shield member from said contact tip in the direction toward said workpiece, said shield member having upper and lower surfaces with respect to said direction and an outer surface between said upper and lower surfaces, said upper surface of said shield member being spaced from said second end of said exhaust tube in said direction to define therewith a radial entrance to said exhaust tube generally transverse to said contact tip, the juncture between said upper and outer surfaces being shaped to facilitate eddy-free flow of fumes and smoke through said entrance, said shield member at said juncture having an outermost edge radially spaced from said contact tip such that the shield member prevents direct impingement of weld spatter on said second end of said exhaust tube, said shield member having an opening therethrough between said upper and lower surfaces, and an insert of electrically insulating material in said opening, said insert having a lower end spaced in said direction from said contact tip and having an electrode receiving aperture therethrough closely spaced radially from said electrode as it moves toward said workpiece, said insert closing said opening through said shield member radially outwardly of said electrode aperture to protect said contact tip from weld spatter and from the heat of the arc.

2. The improvement according to claim 1, wherein said outermost edge of said juncture is radially spaced from five-sixteenths to three-fourths inch from the axis of said contact tip and the juncture between said upper and outer surfaces is rounded and has a radius of from one-sixteenths to one-fourth inch.

3. The improvement according to claim 2, wherein said outer surface of said shield member tapers downwardly and inwardly at an angle of about 45° with respect to said upper surface, and said upper surface is spaced from said second end of said exhaust tube from one-sixteenth to one-half inch.

4. In a welding gun for self-shielded arc welding including an elongated electrode nozzle having a continuous longitudinal passage therethrough and a contact tip through which an arc welding electrode is adapted to be moved axially of the tip toward a workpiece to be welded while an arc is maintained between the end of the electrode and the workpiece, said arc generating heated fumes and smoke, and means including a source of vacuum for removing said fumes and smoke generated at the arc, the improvement comprising: said means including an exhaust tube having a first end communicating with said source and a second end open toward said workpiece, a shield member, means spacing said shield member from said contact tip in the direction toward said workpiece, said shield member having upper and lower surfaces with respect to said direction and an outer surface between said upper and lower surfaces, said upper surface of said shield member being spaced from said second end of said exhaust tube in said direction to define therewith a radial entrance to said exhaust tube generally transverse to said contact tip, the juncture between said upper and outer surfaces being shaped to facilitate eddy-free flow of fumes and smoke through said entrance, said shield member at said juncture having an outermost edge radially spaced from said contact tip such that the shield member prevents direct impingement of weld spatter on said second end of said exhaust tube, said shield member having an opening therethrough between said upper and lower surfaces, and an insert of electrically insulating material in said opening and apertured to receive said electrode as it moves toward said workpiece, said insert protecting said contact tip from weld spatter and from the heat of the arc, said second end of said exhaust tube surrounding and being generally concentric with respect to said contact tip, and said second end of said exhaust tube and said upper surface of said shield member being located for ambient air, fumes and smoke drawn into said radial entrance to impinge on said contact tip.

5. The improvement according to claim 4, wherein said second end of said exhaust tube is circular, said shield member is frusto-conical, and said outer surface tapers downwardly and inwardly from said upper surface, the radius of said outermost edge of said juncture being at least equal to the radius of the outermost edge of said second end of said exhaust tube.

6. The improvement according to claim 5, wherein the taper of said outer surface of said shield member is at an angle of about 45° with respect to said upper surface.

7. The improvement according to claim 4, wherein said exhaust tube includes a fixed portion terminating above said contact tip and a removable extension portion telescoped to said fixed portion and having a lower end defining said second end, said shield member being mounted on said lower end of said extension portion.

8. The improvement according to claim 7, wherein said outermost edge of said juncture is radially spaced from five-sixteenths to three-fourths inch from the axis of said contact tip, the juncture between said upper and outer surfaces is rounded and has a radius of from one-sixteenth to one-fourth inch, and said upper surface is spaced from said lower end of said extension portion from one-sixteenth to one-half inch.

* * * * *